No. 866,934. PATENTED SEPT. 24, 1907.
F. J. KATZ.
BINDER ATTACHMENT FOR BALING PRESSES.
APPLICATION FILED SEPT. 28, 1905.
6 SHEETS—SHEET 2.
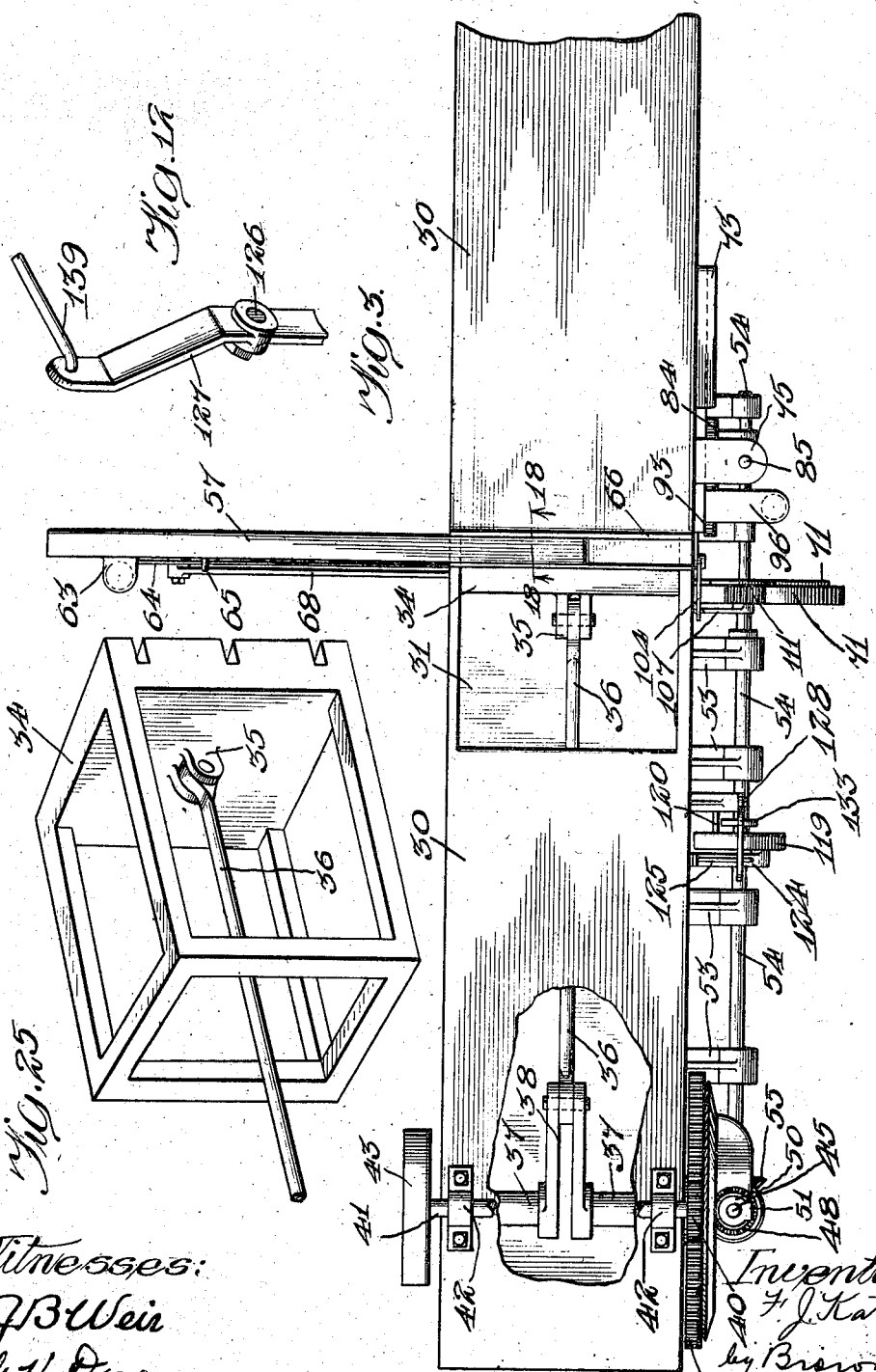

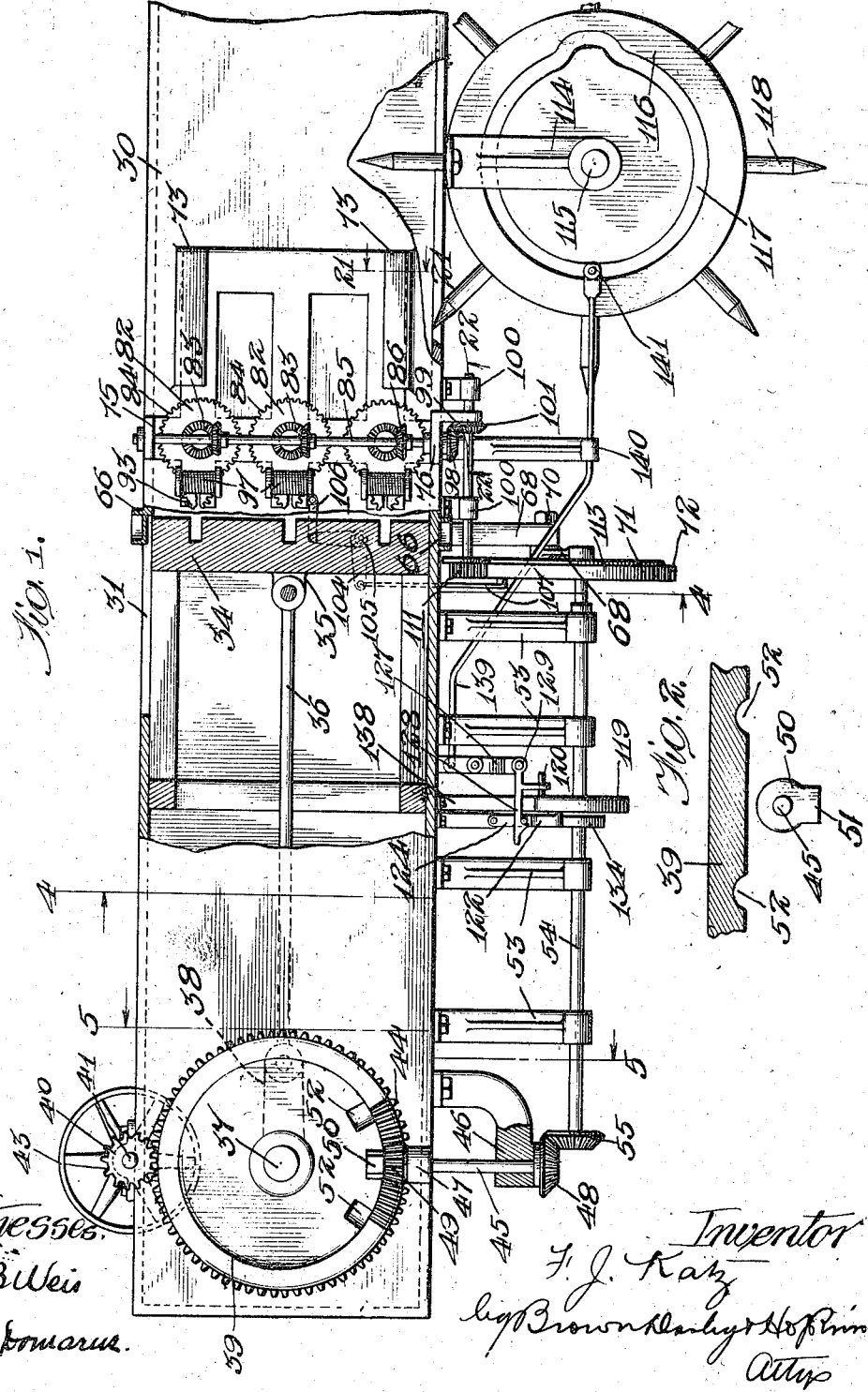

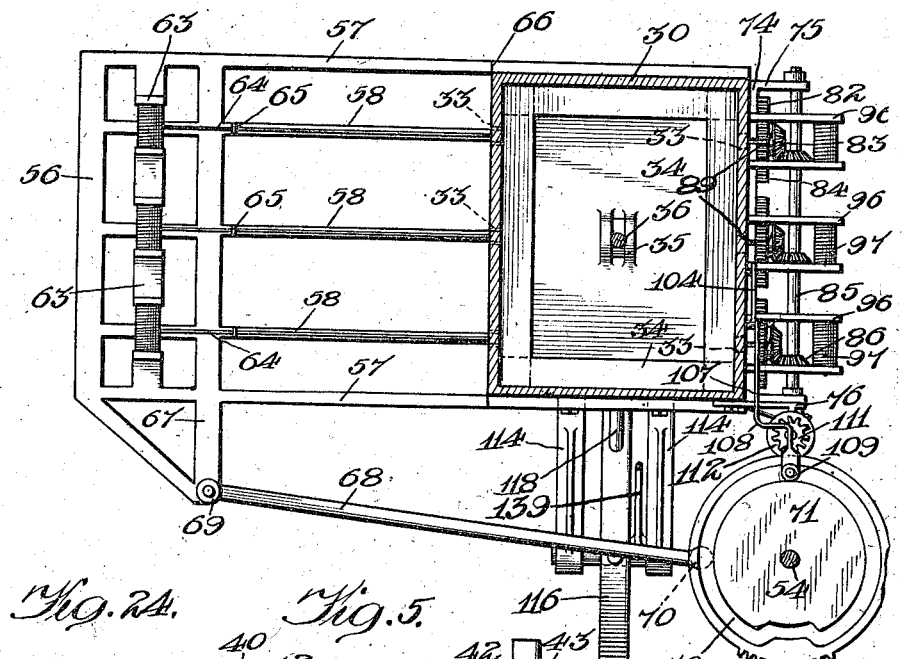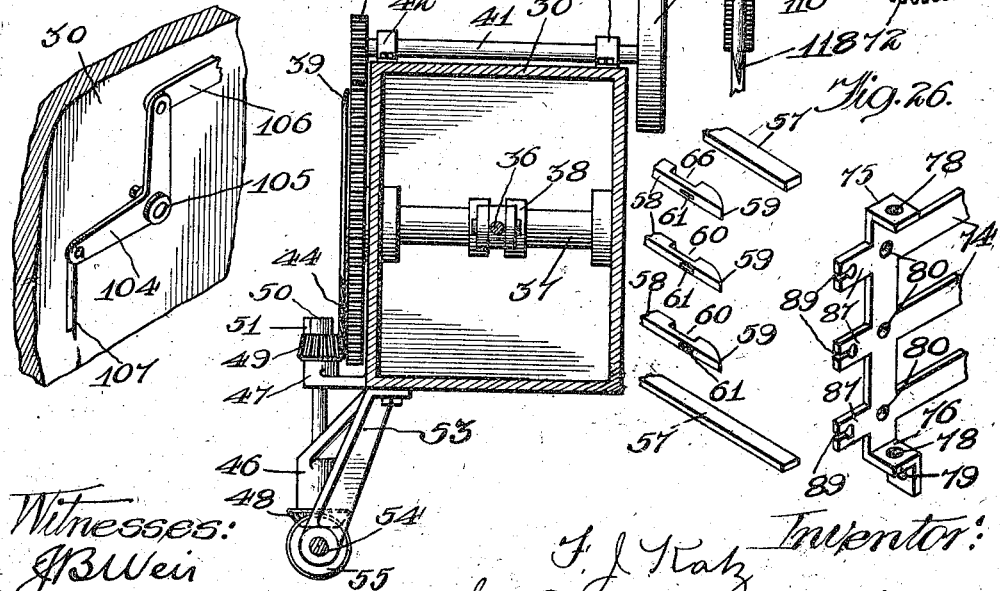

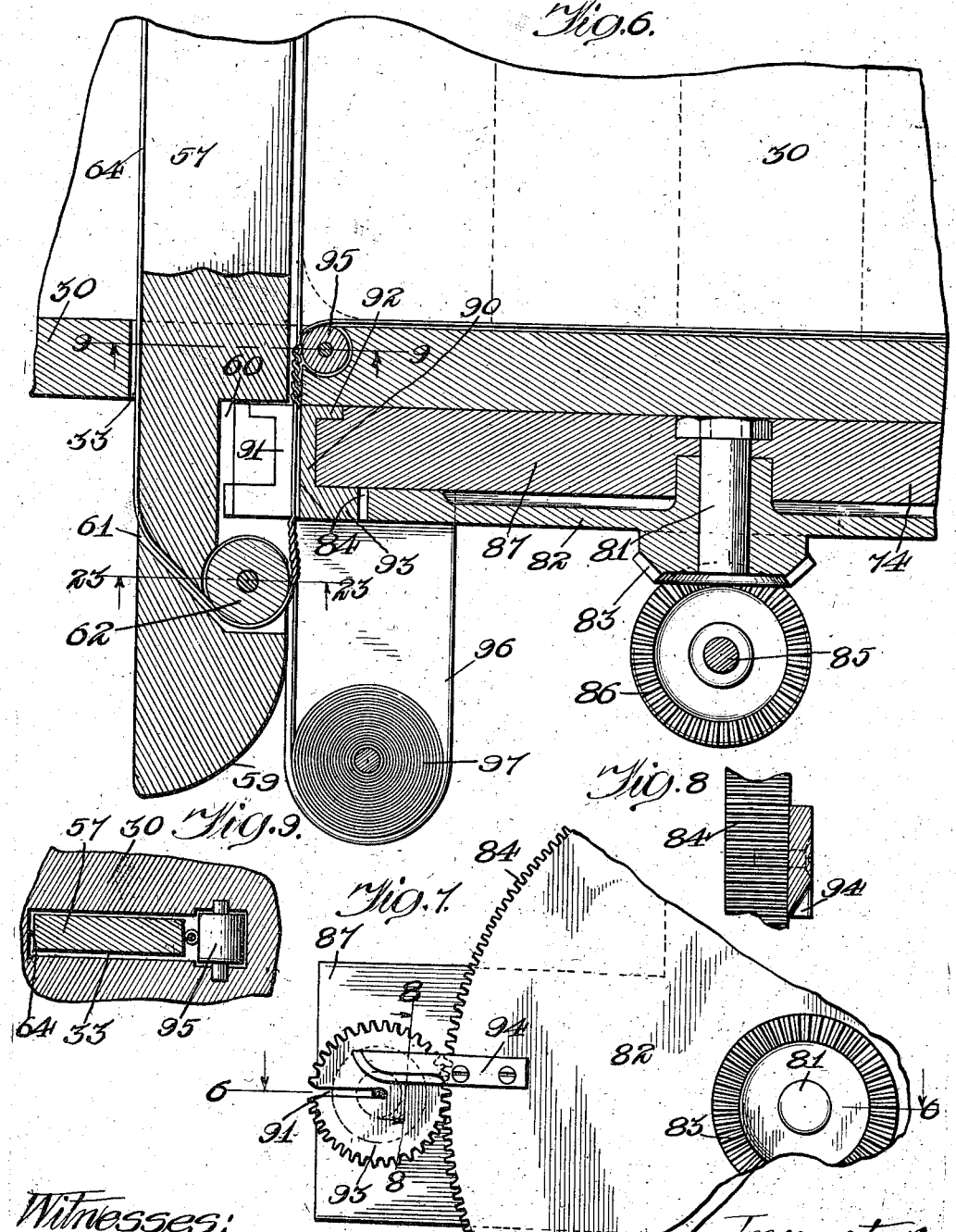

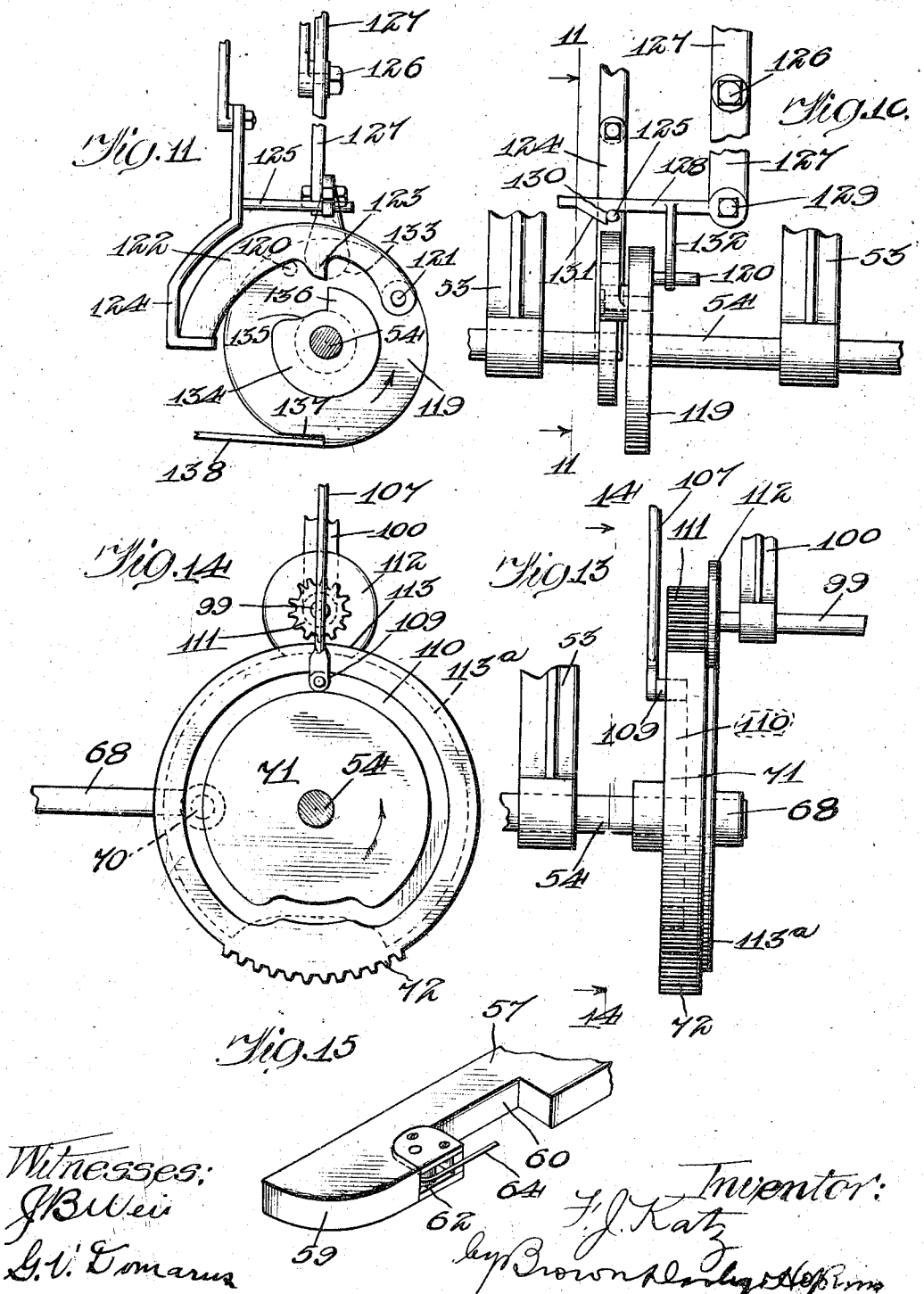

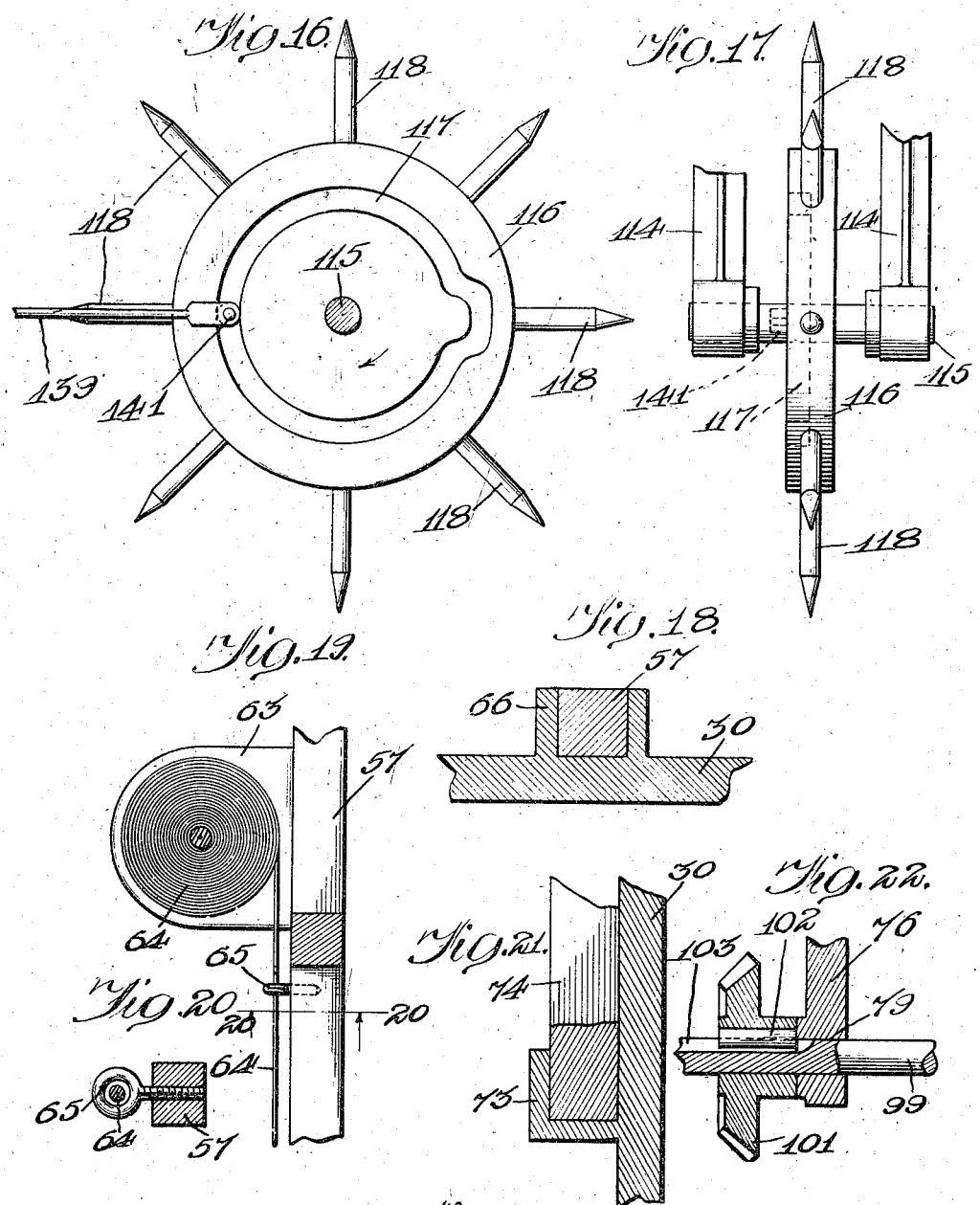

UNITED STATES PATENT OFFICE.

FREDERICK J. KATZ, OF CHICAGO, ILLINOIS.

BINDER ATTACHMENT FOR BALING-PRESSES.

No. 866,934.      Specification of Letters Patent.      Patented Sept. 24, 1907.

Application filed September 28, 1905. Serial No. 280,402.

*To all whom it may concern:*

Be it known that I, FREDERICK J. KATZ, a citizen of the United States, residing at Chicago, county of Cook, and State of Illinois, have invented certain new and useful Improvements in Binder Attachments for Baling-Presses, of which the following is a specification.

This invention relates to baling presses, but more particularly to an improved attachment for said press by means of which a bale or band may be applied to the compressed material before being discharged from the press, and the invention has for its primary object to construct an improved machine of this character which will be efficient and rapid in operation.

To this end, and the accomplishment of other new and useful objects as will appear, the invention consists in certain features of novelty in the construction, combination and arrangement of parts hereinafter fully set forth and claimed, and shown in the accompanying drawings, illustrating an example of my invention, in which,—

Figure 1 is a side elevation of a press, partly in section, with my improvement applied thereto. Fig. 2 is an enlarged detail view partly in section of the locking mechanism for the operating shaft. Fig. 3 is a top plan view with a portion of the press broken away. Fig. 4 is a vertical irregular section on line 4—4 of Fig. 1, Fig. 5 is a vertical section on line 5—5, Fig. 1. Fig. 6 is an enlarged detail section on line 6—6 of Fig. 7, showing in addition thereto one of the needles in its locked position with relation to the twister frame. Fig. 7 is a detail elevation of the twister, the operating gear therefor and the cutting mechanism. Fig. 8 is a section on line 8—8 of Fig. 7. Fig. 9 is a section on line 9—9 of Fig. 6. Fig. 10 is an end elevation of the locking mechanism for the needles and twister frame. Fig. 11 is a section on line 11—11 of Fig. 10. Fig. 12 is an enlarged detail of the operating lever for the locking mechanism. Fig. 13 is an end elevation of the twister frame operating mechanism. Fig. 14 is a section on line 14—14 of Fig. 13. Fig. 15 is an enlarged detail perspective of the end of one of the needles. Fig. 16 is an end elevation of the operating wheel for the controlling of the needle and twister frame locking device. Fig. 17 is a front elevation thereof. Fig. 18 is a section on line 18—18 of Fig. 3. Fig. 19 is an enlarged detail section of the end of one of the needles showing the manner of mounting the spool of wire thereon. Fig. 20 is a section on line 20—20 of Fig. 19. Fig. 21 is a section on line 21—21 of Fig. 1. Fig. 22 is a section on line 22—22 of Fig. 1. Fig. 23 is a section on line 23—23 of Fig. 6. Fig. 24 is an enlarged detail of the bell crank lever for moving the twister frame. Fig. 25 is a detail perspective of the plunger head; and Fig. 26 is an enlarged detail perspective view showing the relative positions of the needles and twister frame.

In the drawing, similar reference characters designate the same parts throughout the several views.

Referring more particularly to the drawings, the numeral 30 designates a baling chamber provided with a feed opening 31 through which the material to be compressed is inserted and 33 are a series of vertically alined and diametrically opposite openings arranged in the side walls thereof, as shown in Figs. 4, 6 and 9 of the drawings. Adapted to slide within this chamber is a plunger head 34, preferably hollow in construction, as shown in Fig. 25, and carried by the rear of the front wall thereof are a pair of ears or projections 35 to which is loosely pivoted one end of a plunger rod 36. Journaled at the forward end of the chamber 30 is a shaft 37 provided with a crank arm 38 to which the free end of the plunger rod 36 is loosely connected. A gear wheel 39 is secured to one end of said shaft, preferably on the outside of the chamber 30, as shown, and meshing with said gear is a pinion 40, secured to shaft 41, journaled in suitable bearings 42, and said shaft may be operated in any desired manner but preferably by means of a driven pulley 43, carried thereby.

The gear wheel 39 is provided in its face, and preferably near the periphery thereof, with a short section of radial teeth 44. A shaft 45 is journaled in suitable brackets or bearings 46 and 47, adjacent the gear wheel 39, and 48 is a bevel pinion carried by one end thereof. Carried by the other end of the shaft 46, adjacent to the teeth 44 on the gear 39, and in such a position as to be engaged by the said teeth, is a gear pinion 49, and said pinion is provided with a hub 50 having a flattened or squared portion 51 adapted to rest upon and be held by the face of the wheel 39. The teeth 44 of the gear 39 are of a sufficient number to engage and turn the pinion 49 only once during the complete revolution of the wheel 39. Cavities or recesses 52 are arranged in the face of the wheel 39, so that the centers thereof are in a direct line with each end tooth of the section 44. It will be seen that when the wheel 39 is rotated, assuming the parts to be in the position as shown in Fig. 1, the pinion 49 will be revolved and just as said pinion is about to complete or commence its operation one of the cavities 52 will be in the proper position to receive the corner of the flattened portion 51 of the hub 50, thus bringing said flattened portion against the smooth face of the wheel 39. The teeth 44, having now passed out of engagement with the pinion 49, upon the completion of its revolution, will permit the portion 51 to remain in contact with the face of the wheel 39 to hold the shaft 45 against rotation, until the teeth are about to engage the pinion again. At this time the other cavity will be in a position to permit the corner of the flattened portion 51 to pass therein, and the gear will be operated again, thus producing an intermittent rotation and locking of these parts.

Journaled in suitable bearings 53 is a shaft 54 which is constructed in two sections and carried by one section of said shaft is a pinion gear 55 which is arranged to engage and be driven by the gear 48 carried by the shaft 45.

The numeral 56 designates what I term a needle frame and said frame is preferably of the construction shown and is provided with extending bars or guide arms 57 located preferably at the top and near the bottom thereof. Carried by said frame are a plurality of needles 58. These needles are preferably provided with a round extremity 59 and their outer ends are provided with a notched or cut away portion 60. Said needles are also each provided with an aperture or slot 61 passing through the end thereof and communicating with the notched or cut away portion 60. Journaled within the notched portion 60 and adjacent to the slot 61 and in a position to receive and guide a wire passed through the slot is an antifriction or guide pulley 62. Carried by each of the needles and at any desired point is a bracket or support 63 which retains and holds a spool or coil of wire 64, and 65 is an eye or guide through which the wire 64 which passes over the pulley 62 is guided and held. The needle frame is adapted to move transversely across the baling chamber at a point just beyond the feed opening 31 therein.

Brackets or guides 66 are secured to the top and bottom of the chamber 30, arranged transversely thereof, and are adapted to receive and guide the arms 57 of the needle frame in such a position that when said frame is reciprocated transversely of the chamber the needles 58 will pass through the alined openings 33 in the walls of said chamber. A projection or extension 67 is carried by the frame 56 and said projection preferably extends below the line of the base of the chamber 30, and 68 is a rod or bar with its end 69 loosely pivoted to the frame, preferably to the projection 67 thereof, the other end thereof being connected to the crank pin 70, carried by the disk wheel 71, which is mounted on the second section of the shaft 54, said wheel 71 being provided in its periphery with a short section of gear teeth 72, for the purpose hereinafter set forth.

Mounted in guides or ways 73, secured to the outside of one of the walls of the chamber 30, and disposed to slide at a right angle to the path of movement of the needle frame 56, is a twister frame 74, which is provided with radially extending brackets 75 and 76, and 78 are bearings formed in said brackets. A second bearing 79 is formed in the bracket 76 for a purpose to be set forth. Journaled to said frame in suitable bearings 80 located preferably adjacent to the bearings 78, and by suitable means such as stub shafts 81, are a plurality of double gear wheels 82 each of which is provided with the gear teeth 83 and 84. A shaft 85 is journaled in the bearings 78, and 86 are a plurality of gears carried by said shaft which engage the teeth 83 of the gears 82 for transmitting motion thereto.

The forward end of the twist frame 74 is provided with a plurality of longitudinally extending fingers or projections 87 each of which is provided in their extremity with a bearing or journal 88, and 89 is a transverse open slot communicating with the bearing. A twister head 90, provided with a slot 91, a shoulder 92, and a gear 93 is journaled in the bearings 88 in such a position that the shoulder 92 and gear 93, will stand astride the projection or extensions 87, to prevent displacement of the same and with its slot 91 registering with the slot 89 in said projection or extension and also with its gear 93 meshing with the teeth 84 of the disk or gear 82. Secured to and carried by the gear or disk 82 and projecting beyond the periphery thereof and extending beyond the base of the slot 91, in the twister head, is a knife or cutter 94. Pulleys 95 are preferably journaled in the walls of the chamber 30 adjacent to the edge of the openings 33 therein, and over which one strand of the wire passes, as will be set forth.

Suitable brackets 96 are carried by the twister frame 74, and 97 are spools or coils of wire mounted therein. A pinion 98 is also carried by the shaft 85, and 99 is a shaft journaled in suitable bearings 100, and passing through the bearings 79 in the twister frame 74. A gear wheel 101 is feathered or keyed to the shaft 99 by means of the pin or key 102 and way 103, and said gear meshes with the gear 98, carried by the shaft 85. This gear is so arranged as to stand between and be held from displacement by the gear 98 and the face of the bracket 76, as will be seen.

A bell crank lever 104 is pivoted at 105 to the walls of the chamber 30 and 106 is a link or rod connecting one end of the lever to the twister frame 74 as shown in Fig. 1. To the other end of the lever is connected a rod 107 which is bent as shown at 108 in Fig. 4 to permit free motion. And said rod is provided with an antifriction roller 109 which is adapted to travel in the cam groove 110 in the face of the disk or mutilated gear 71. The teeth 72 of said gear or disk 71 are adapted to engage and rotate a gear pinion 111 carried by the shaft 99 by which said shaft is rotated. Said gear 111 is provided with a flange or hub 112, (see Figs. 13 and 14), which has a cut away portion 113 adapted to receive a flange or projection 113ª, carried by the disk or gear 71, thereby forming what is commonly known as a "Geneva lock" for locking the parts together to prevent the continuous and allow only an intermittent rotation of the twister.

Mounted in suitable brackets 114 is an axle 115 carrying a disk or wheel 116 and said disk is provided with a cam groove 117, and 118 are a plurality of pins or projections disposed around the periphery thereof and which are adapted to extend through the wall of the chamber 30 and within the path of the movement of the material compressed.

The two sections of the shaft 54 are locked together in the following manner,—Carried by the end of one of the sections is a disk or wheel 119 and 120 is a radial projection or pin extending from one of its faces and located preferably near the periphery thereof. To the opposite face thereof and adjacent to the other shaft section, and by means of the pin 121, is pivoted a pawl or dog 122, which is provided with a nose or tooth 123, and said dog or pawl 122 is of such a size that the end thereof will project for some distance beyond the periphery of the disk or wheel 119. Pivoted to any suitable support, preferably the framework, is an arm or stirrup 124, which is of such a shape to allow it to readily pass the end of the dog or pawl 122 for engaging the extremity thereof to hold the same elevated, as will be set forth, and 125 is a pin or radial projection extending from said stirrup. Adjacent to the stirrup 124 and pivoted to a suitable support as at 126, is pivoted a lever 127, and 128 is a latch or hook pivoted as at 129 to the lever 127. Said latch or hook is provided with a nose 130 having an inclined face 131 and said nose is adapted to engage the pin or projection 125 as will be set forth. Depending from said latch or hook 128 is an arm or projection 132 which is provided with a rounded extremity 133 and said extremity stands within the path of the movement of the pin or projection 120, and is raised by said pin when the same contacts therewith. Secured to the other section of the shaft, and adjacent to the disk or wheel 119, is a disk or hub 134, provided with a notch 135 in its periphery forming a shoulder 136 which is adapted to be engaged by the nose or projection 123 of the dog or pawl 122, when said pawl is released from the stirrup 124. It will be seen that when the nose or projection 123 engages the shoulder 136 the two sections of the shaft will be locked together.

In order to prevent the section of the shaft 54, which controls the binding and twisting mechanism from turning backward I provide a notch 137 in the periphery of the disk or wheel 119, which is adapted to be engaged by a spring 138. Connected to the free end of the lever 127 is a rod or bar 139, bent as shown, and 140 is a guide or bearing in which said rod is adapted to slide. The free end of said rod is provided with an antifriction roller 141 adapted to travel in the cam groove 117 of the disk or wheel 116.

Starting with the press empty, and assuming the sections of the shaft 54 to be capable of the independent rotation, and with the ends of the wires 64 threaded through the slots 61 in the ends of the needles, the operation is as follows: One end of each of the wires 97 is passed through the openings 33 in the walls of the chamber across the chamber and adjacent to the wires 64 carried by the needles 57. The two wires are then twisted together and motion transmitted to the pulley 43 which will set the machine in motion and cause the plunger head to reciprocate, a charge having been placed in the press through the opening 31 in advance of the plunger head and in front of the wires. As the charges are compressed they are pressed forward by the plunger, carrying in advance of them the wires which have been passed through the press, said wires being paid out from the spools as the size of the bale increases. It is to be understood that the size of the bales may be regulated at will and is governed by means of the projections 118 carried by the disk or wheel 116, and which are moved by means of the compressed material coming in contact therewith. As the material is advanced the projections will be moved, the wheel rotated, and the lever 127 will be operated through the medium of the rod and cam groove 117. The operation of this lever will cause the latch or hook 128 to pull the stirrup or arm 124 out from under the end of the dog or arm 122 upon the completion of the last stroke which forms the desired size of bale, which will permit said dog to drop, allowing the shoulder 136 to contact with the nose or projection 123 thereby locking both sections of the shaft together. The continued rotation of the shaft 54 will then rotate the disk or wheel 71, carried thereby, and said wheel through the medium of the rod 68 will cause the needle frame 56 to travel transversely across the chamber, the needles passing through the opening 33 therein, said needles carrying with them the wires 64 to which has been twisted the end of the wire 97. At the same time, the twister frame 74, carrying the twisters 90, is brought forward through the medium of the cam groove 110, moving the rod 107, thus operating the bell crank 104, which will draw said frame forward so that the ends or projections 87 thereof will enter and stand within the notches 60 in the ends of the needles 57. This operation will place two strands of wire together as shown in Fig. 6, and as the twister frame advances these two strands will pass into the twister head 92. The section of gear teeth is so arranged that, when the parts have assumed this position they will engage the pinion 111 carried by the shaft 99 which causes the gear 101 to transmit motion to the shaft 85, the gear 101, being keyed to the shaft 99 to permit of its sliding motion when the twister frame 74 is advanced and retracted as will be understood. Rotary motion being transmitted to the shaft 85, will cause the gears 82, through the medium of the intermediate gears 86 and 83, to rotate the gear wheel 82, and as the peripheral teeth 84 thereof mesh with the gear 93 of the twister they will rotate the latter, thus twisting the two strands of wire on both sides of the twister, as shown in Fig. 6. Carried by the face of the gear 82 is a cutter 94 which is so arranged as to cut the twisted wire between the twisted portions and at a point slightly remote from the end of the needle so as not to sever the two wires, but to leave them engaged so that upon the return movement of the needles the wires 97 will be drawn across the chamber for the next bale. After the first bale has been bound and discharged it will be seen that it is not necessary to connect the wires by hand for the remaining bales until all of the wire has been used and a new coil inserted. In order to prevent the continuous rotation of the twisters and to permit only an intermittent rotation thereof I provide a Geneva lock, which consists of coöperating disks, the periphery of one of said disks being cut away to receive a portion of the periphery of the other, and said disks are arranged respectively on the shaft 99 which operates the twisters and the shaft 54, which drives the shaft 99. The crank pin 70 and cam groove 110 are so arranged in the disk wheel 71 that the twister and needle frame will be locked in position and held during the twisting of the wires. The cam groove operates upon the rod 107 a trifle in advance of the operation of the pin 70 upon the rod 68, so that the twister frame is drawn back out of the notch 60 in the needles just a trifle before the latter begin to move. After the wires have been twisted and cut the cam groove 117 carried by the wheel 116 is so timed that it will operate the lever 127 through the medium of the rod or bar 139 to cause the hook or latch 128 to draw the end of the stirrup 124 in the path of the movement of the end of the dog or pawl 122, which will be engaged thereby and the projection 123 will be thus disengaged from the shoulder 136 which will cause the sections of the shaft to be unlocked. In order to prevent any backward movement of the section which controls the operation of the needles and twisters I provide a notch or shoulder 137 in the periphery of the disk or wheel 119, which is adapted to be engaged by the spring 138.

It is to be understood that the size of the bale is controlled by the disk or wheel 116, the number of pins or projections carried thereby and the arrangement of the cam groove 117 therein.

I desire it understood that I do not wish to be limited to the exact construction and arrangement of the several parts, as various changes may be made without departing from the spirit of my invention.

Having thus described my invention, what I claim as new therein, and desire to secure by Letters Patent, is,—

1. In a baling press, the combination of a compression chamber, a binding mechanism comprising a movable needle frame and a twister frame, means for operating the frames to seat the wires in the movable twister, means for operating the twister, and means operatively related to the twister for cutting the twisted wires at a point intermediate the ends of their twisted portions.

2. In a baling press, the combination of a compression chamber, a binding mechanism comprising a movable needle frame and a movable twister frame, means for operating the frames to seat the wires in the twisters, means for operating the twisters and means carried by the twister operating mechanism for cutting the twisted wires at a point intermediate to the ends of their twisted portions.

3. In a baling press, the combination of a chamber, means for compressing the material, a twister frame, a needle frame, a rotating shaft, means for moving the frames, means for locking the twister operating mechanism while the frames are being moved, and means whereby the movement of the compressed material will cause said shaft to move the frames and to unlock and operate the twisters.

4. In a baling press, the combination of a compression chamber, a binding mechanism, a shaft, connections between said shaft and binder for operating the latter, a pinion carried by the shaft, and a gear engaging the pinion for driving the shaft, said gear and pinion being provided with inter-engaging portions for locking said shaft to prevent a continuous rotation thereof.

5. In a baling press, the combination of a compression chamber, binding mechanism, a shaft, means for transmitting motion from the shaft to the binder, a pinion carried by the shaft, said pinion being provided with a flattened portion, a gear engaging the pinion, said flattened portion being adapted to engage the face of the gear, for locking the pinion against continuous rotation.

6. In a baling press, the combination of a compression chamber, binding mechanism, a shaft, connections between the shaft and binding mechanism, a pinion secured to the shaft, a hub carried by the pinion and being provided with a flattened portion, a gear engaging the pinion, the face of said gear being provided with recesses adapted to permit the flattened portion thereof to be brought into and out of engagement with the face of the gear.

7. In a baling press, the combination of a compression chamber, binding mechanism, a shaft, means for transmitting motion from the shaft to the binder, means for rotating the shaft and coöperating locking means carried by the shaft and its operating mechanism for locking and unlocking said shaft to permit only a single rotation thereof.

8. In a baling press, the combination of a compression chamber, binding mechanism, a shaft, means for transmitting motion from the shaft to the binder, a wheel which is provided on its face with a section of gear teeth and cavities adjacent each of the end teeth of said section, a pinion wheel carried by the shaft adjacent to and engaging the teeth, and being provided with a flattened portion, one of said cavities being adapted to receive the corner of the said flattened portion upon the commencement or completion of one complete revolution of the pinion.

9. In a baling press, the combination of a compression chamber, a binder, a shaft comprising a rotating and an idle section, connections between the idle section and the binder, locking means carried by the contiguous ends of the shafts, said locking means comprising an engaging pawl and shoulder, a stirrup adapted to be engaged by the latch for raising the latter, and means for withdrawing the stirrup from its engagement with the latch.

10. In a baling press, the combination of a compression chamber, a binder, a shaft comprising a rotary and an idle section, connections between the binder and the idle section, locking means carried by the contiguous ends of the shafts, and comprising a pawl and a shoulder, a stirrup standing within the path of the rotation of the pawl and adapted to be engaged by the pawl to release the same, and means controlled by the compressed material for releasing the stirrup from said pawl.

11. In combination with a machine of the class described, a shaft comprising a rotating and an idle section, a shoulder carried by one of the sections, a pawl carried by the other section and adapted to engage the shoulder, an arm standing within the path of the rotating movement of the pawl, a latch engaging said arm for moving the same and means for releasing the latch.

12. In combination with a machine of the class described, a shaft comprising a rotary and an idle section, a shoulder carried by one section and a pawl carried by the other section, a pivoted arm standing within the path of the rotary motion of the pawl, a projection carried by the arm, a latch engaging the projection for moving the arm, a projection carried by the latch, and a lug carried by one of the shaft sections for engaging the projection to release the latch.

13. In combination with a machine of the class described, a shaft comprising a rotary and an idle section, a shoulder carried by one section, a disk carried by the adjacent end of the other section, a pawl pivoted to the disk and extending beyond the periphery thereof, said pawl being adapted to engage the shoulder, a stirrup, a projection carried thereby, a latch, means for causing the latch to engage the projection to disengage the stirrup from the pawl, a projection carried by the arm and means carried by the disk for engaging the projection to release the latch from its engagement with the stirrup.

14. In combination with a machine of the class described, a shaft comprising a rotary and an idle section, a shoulder carried by one section, a disk carried by the other section, a pawl pivoted to one face of the disk and adapted to engage the shoulder, a pivoted stirrup standing within the path of the rotary movement of the pawl, a projection carried by the stirrup, a lever pivoted adjacent to the stirrup, a latch pivoted to the lever, said latch being provided with a shoulder and an inclined end, means for operating the lever to cause the latch to engage the projection for raising the stirrup, a projection carried by the latch, and a projection carried by the other face of the disk and adapted to engage the projection on the latch for releasing the same.

In testimony whereof I have signed my name to this specification, in the presence of two subscribing witnesses, on this 26th day of September A. D. 1905.

FREDERICK J. KATZ.

Witnesses:
FRANCIS A. HOPKINS,
CHAS. H. SEEM.